United States Patent Office 3,220,542
Patented Nov. 30, 1965

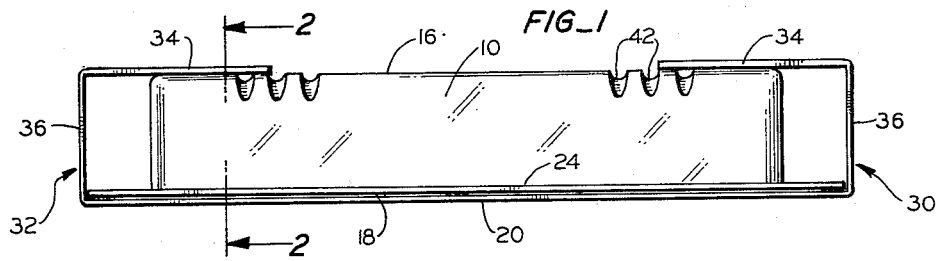
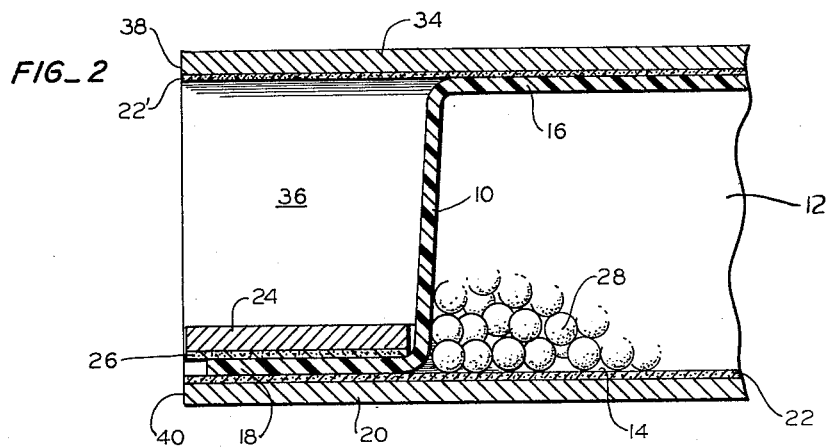
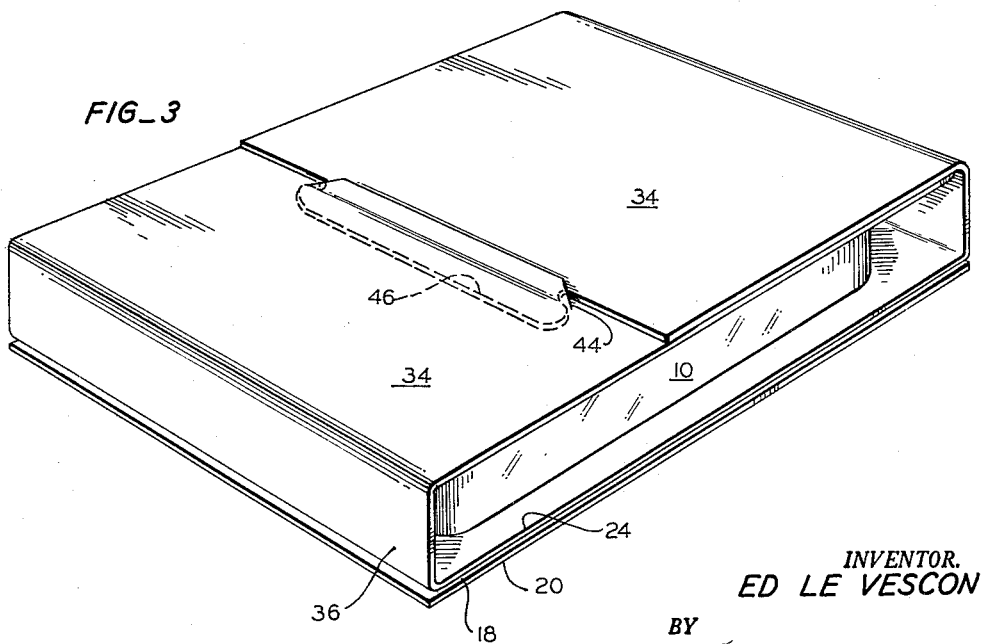
INVENTOR.
ED LE VESCONTE
BY
ATTORNEYS

3,220,542
FROZEN FOOD CONTAINER
Ed Le Vesconte, Redwood City, Calif., assignor to H. S. Crocker Co., Inc., San Bruno, Calif., a corporation of California
Filed Dec. 5, 1960, Ser. No. 73,697
5 Claims. (Cl. 206—45.31)

This application is a continuation in part of my copending application Serial No. 51,806 filed August 25, 1960, now Patent No. 3,154,215.

This invention relates to frozen food containers and the like and more specifically to such containers having transparent wall portions through which the contents of the container can be viewed.

In my above-identified application, I have shown a frozen food container having a body constructed of a transparent material and having a cavity therein and a mouth in one side of the body; the body is provided with an outwardly extending flange surrounding the mouth to which the lid of the body is attached, and means are provided for masking a portion of the side walls of the transparent body surrounding the mouth to obscure frost in the container adjacent to the lid. The masking means may be carried by a ring underlying the flange on the transparent body, and the surfaces of the lid and ring adjacent to the flange are provided with a suitable adhesive whereby the lid and ring may be simultaneously pressed upon the flange, with application of heat if desired, to hermetically seal the container.

The container construction shown in said application is very desirable, and it is an object of this invention to provide an improved frozen food container having all of the advantages of the container shown in that application.

It is another object of this invention to provide an improved container which can be handled and displayed on the grocer's shelf more efficiently than the container shown in said application.

It is another object of this invention to provide an improved transparent container which may be filled and assembled as easily as the container shown in said application and which may be supported and displayed in a stable condition on its edge.

It is another object of this invention to provide such an improved transparent container which has the shape of a parallelepiped whereby it may be handled efficiently by conventional container handling machinery.

It is another object of this invention to provide an improved frozen food container in which a greater portion of the contents of the container are masked than in the container shown in said application.

It is another object of this invention to provide such an improved frozen food container having transparent wall portions through which the contents of the container are displayed and in which portions of the wall portions are masked to display said contents through a picture shaped portion of the wall.

It is another object of the invention to provide such an improved frozen food container which may be manufactured and assembled as economically and efficiently as possible.

Other objects and advantages of the present invention will become apparent from the following description read in conjunction with the attached drawings in which:

FIG. 1 is a view in side elevation of an improved frozen food container constructed in accordance with this invention;

FIG. 2 is a vertical sectional view of the container of FIG. 1 taken along the plane indicated at 2—2 in FIG. 1, and FIG. 3 is a perspective view of a modified form of frozen food container constructed in accordance with this invention.

Referring now in detail to the drawings, and particularly to FIGS. 1 and 2, the frozen food container illustrated therein comprises a generally rectangular body 10 constructed of a transparent plastic material such as polystyrene and having a cavity 12 therein and a mouth 14 in one side thereof. The mouth 14 is shown as being in the bottom of the body 10 since the container is illustrated in the drawings in one of its positions for display of the container contents through the transparent wall 16 of the body opposite to the mouth 14; when the container is filled, the body 10 is inverted to permit food to be poured into the container from the top.

A flange 18 integrally molded with the remainder of the body 10 surrounds the mouth 14 and lies in a plane generally parallel to the body wall 16. A lid member 20, provided with an adhesive coating 22, covers the mouth 14 and the flange 18 and extends for a short distance beyond the periphery of the flange 18. A support ring 24, provided with a layer of adhesive 26, contacts the surface of the flange 18 opposite to the lid 20.

The adhesive layers 22 and 26 may be made of any desired adhesive but are preferably made of a thermoplastic material by which the lid 20 and ring 24 may be sealed to the flange 18 and to each other by heat and pressure. The adhesive layers 22 and 26 may be provided on auxiliary carriers or as self-sustaining sheets prior to container assembly or they may be provided on the flange 18 of the body 10. In some instances it may be desirable to construct the body 10 of a transparent thermoplastic material such as polyethylene in which case the flange 18 might eliminate the desirability of the layers 22 and 26. It should be noted, however, that the provision of the layers 22 and 26 is desirable because it provides an efficient means of sealing the container and because the layer 22 makes the lid 20 impervious to gas or vapor diffusion therethrough.

When the container is assembled the body is supported in inverted position, as indicated above, and a food product 28 is poured therein; the lid 20 and ring 24 are then pressed together over the flange 18, with the application of heat if desired, to seal the lid 20 and the ring 24 to the flange 18 and to each other.

Integrally formed with the lid 20 is a pair of flap members 30 and 32 on opposite edges of the lid 20. Each of these flap members 30 and 32 includes a first flap portion 34 overlying a portion of the wall 16 of the body 10 and a second flap portion 36 generally perpendicular thereto and connecting the flap portion 34 to the lid 20. As indicated in FIG. 2, the edges 38 of the flap portions 34 and 36 are parallel to the edges of the lid 20 and lie in planes generally perpendicular to the lid 20 through the free edges 40 of the lid 20.

The flap portions 34 are preferably attached to the wall 16 of the body 10, and this attachment may be accomplished by provision of a small amount of additional adhesive 22' between the flap portions 34 and the wall 16 of the body 10. In this regard, it should be noted that a plurality of grooves 42 are provided in the wall 16 of the body 10 to add rigidity to the body 10, and the additional adhesive employed for attaching the flap portions 34 to the wall 16 may be deposited conveniently in one of the grooves 42 or on a ridge between such grooves.

As in the container construction shown in my above-identified application, the ring 24 and lid 20 are constructed of an opaque paper product which facilitates application of heat to the adhesive layers 22 and 26 where thermoplastic or thermosetting adhesives are employed. Additionally, the flap portions 34 and 36 are made of the same opaque paper product as the lid 20 thereby providing frost masking means in accordance with the teachings of said application.

It should also be noted that the flap portions 34 on the container in FIGS. 1 and 2 are cut short exposing a generally square, picture shaped area of the wall 16 whereby the top surface of the container as viewed in FIG. 1 presents a picture of the contents of the container framed at each end by a panel on which trademark indicia, etc., may be displayed.

In the modification of the invention illustrated in FIG. 3, the lengths of the flap portions 34 are extended to overlap above the wall 16 of the body 10. One flap portion 34 is provided with a slit 44 and the other flap portion 34 is provided with a mating latch member 46 by which the flap portions 34 are latched together. It should also be noted that in this container the flap portions 34 and 36 are formed as integral extensions of the backing ring 24 instead of the lid 20. The flap portions 34 may be apertured to expose a portion of the contents of the container through the container wall 16.

Both containers illustrated in the drawings may be handled and displayed very efficiently. The containers may be supported in stable condition on the edges 38 and 40. The parallelepiped shape of the containers permit their efficient handling by conventional container handling equipment. In the form of container shown in FIG. 3, the container may be partially assembled by attachment of the ring 24 and flap portions 34 and 36 to the body 10 before filling thereby adding weight to the body 10 prior to filling and giving the partially assembled container a parallelepiped shape to adapt it to handling by conventional container filling machinery.

While two specific embodiments of the invention have been shown and described in detail herein, it is obvious that many modifications of the structures disclosed may be made without departing from the spirit and scope of the invention.

I claim:

1. A container for frozen foods and the like comprising a body of transparent material having a cavity of substantial depth therein with a mouth in the top side of said body and a generally planar outwardly extending flange on said body surrounding said mouth, the bottom of said body being generally flat and generally parallel to said flange, a generally rectangular container closure member attached to said flange to facilitate closure of said mouth and extending outwardly of the periphery of said flange, and container squaring and masking means comprising a pair of opaque flaps attached to said closure member at opposite sides of said body and each having a first portion overlying a portion of said bottom of said body and a second portion extending along the side of said body connecting said first portion to said closure member and masking the contents of said body thereunder, said first portions of said flaps having side edges which lie in the planes generally perpendicular to said flange through edges of said closure member and end edge portions adjacent to said bottom of said body and spaced apart from each other exposing a portion of said bottom of said body.

2. A container for frozen foods and the like comprising a body of transparent material having a cavity therein with a mouth at one side of said body and a generally planar outwardly extending flange on said body surrounding said mouth, a closure member attached to said flange to facilitate closure of said mouth, and a pair of flaps connected to said closure member with said flaps extending away from said mouth of said body toward the side of said body opposite said mouth and having flap portions which overlie a portion of said side of said body opposite to said mouth with said flap portions having spaced apart edge portions which define a window therethrough exposing a portion of said body therebetween.

3. A container for frozen foods and the like comprising a body of transparent material having a cavity therein with a mouth at one side of said body and a generally planar outwardly extending flange on said body surrounding said mouth, a container closure member attached to said flange to facilitate closure of said mouth, said container closure member and said flange defining a composite flange having a generally straight edge portion, a pair of flaps attached to opposite ends of said composite flange with said generally straight edge portion of said composite flange lying between said ends and with each of said flaps having a side edge lying in a plane perpendicular to said flange through said straight edge portion and a flap portion thereof lying on the side of said transparent body opposite to said mouth with said flap portions spaced apart from each other exposing a portion of said opposite side of said body between them.

4. The container of claim 3 in which said closure member comprises a ring surrounding said body and contacting the side of said flange opposite said mouth and in which a lid is provided on said container covering said mouth and contacting the side of said flange adjacent to said mouth.

5. The container of claim 2 in which said two flap portions are spaced from each other exposing said portion of said opposite side of said body between them.

References Cited by the Examiner

UNITED STATES PATENTS

| | | | |
|---|---|---|---|
| 1,790,370 | 1/1931 | Earman | 206—45.31 |
| 2,784,896 | 3/1957 | Hoag | 206—56 |
| 2,921,672 | 1/1960 | Ivy | 206—42 |
| 2,933,182 | 4/1960 | Davis | 206—42 |
| 2,959,277 | 11/1960 | Strange | 206—45.31 |
| 3,011,629 | 12/1961 | Rohdin. | |

FOREIGN PATENTS

| | | |
|---|---|---|
| 456,067 | 11/1936 | Great Britain. |
| 761,924 | 11/1956 | Great Britain. |

THERON E. CONDON, *Primary Examiner.*

EARLE J. DRUMMOND, GEORGE O. RALSTON,
*Examiners.*